D. P. SHARP.
Horse-Rake.
No. 223,012. Patented Dec. 30, 1879.
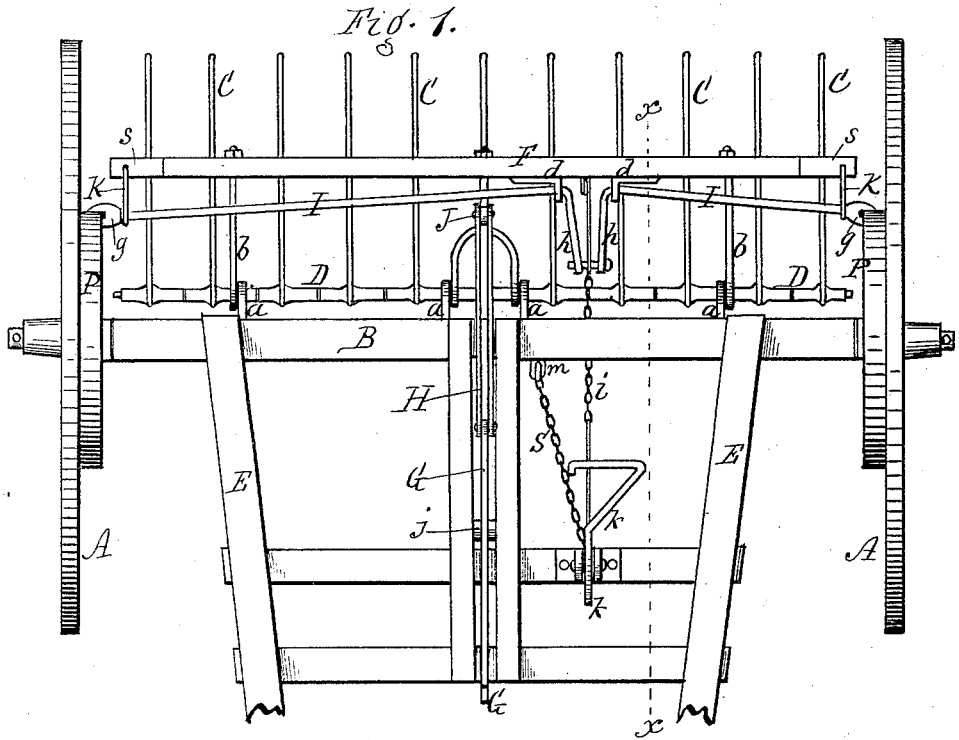
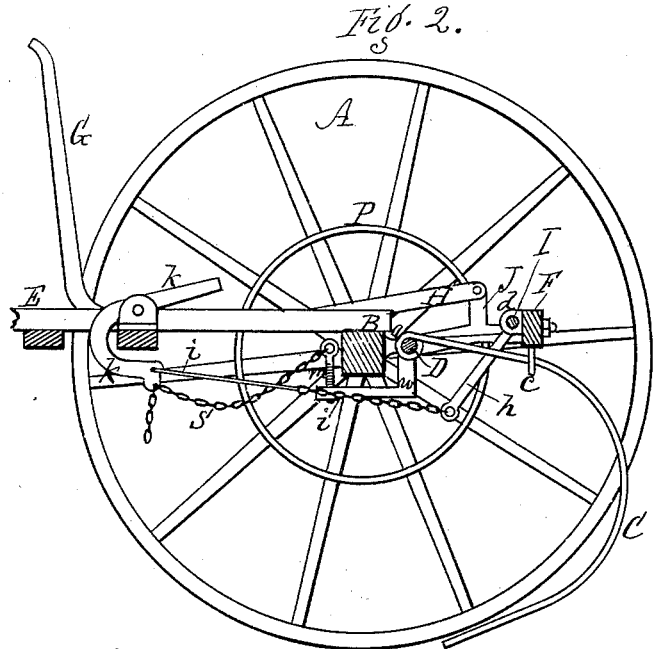
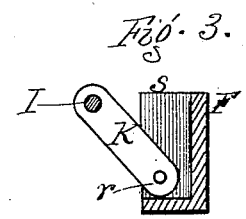
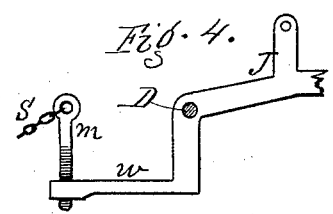
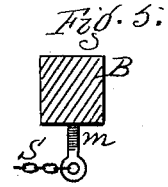
Attest.
Chas F. Duryea
Jas. Chase
Inventor.
Dennis P. Sharp,
pr R. T. Osgood,
Atty.

UNITED STATES PATENT OFFICE.

DENNIS P. SHARP, OF ITHACA, NEW YORK, ASSIGNOR TO CHARLES M. SHARP, OF SAME PLACE.

IMPROVEMENT IN HORSE-RAKES.

Specification forming part of Letters Patent No. 223,012, dated December 30, 1879; application filed August 28, 1879.

*To all whom it may concern:*

Be it known that I, DENNIS P. SHARP, of Ithaca, in the county of Tompkins and State of New York, have invented a certain new and useful Improvement in Horse-Rakes; and I do hereby declare that the following is a full, clear, and exact description of the same, reference being had to the accompanying drawings, in which—

Figure 1 is a plan of the rake. Fig. 2 is a cross-section in line $x\ x$. Figs. 3 and 4 are detail views. Fig. 5 is a modification.

My improvement relates to mounted horse-rakes; and the invention consists in the construction and arrangement hereinafter more fully described, whereby the rake is made more effective in dumping the load.

In the drawings, A A represent the driving-wheels. B is the axle. C C are the rake-teeth. E E are the thills. The rake-teeth are attached to a rod, D, secured permanently to the axle by stiff arms $a\ a$. F is a rider-bar resting above the rake-teeth, and connected with rod D by arms $b\ b$, pivoted so as to allow the rider-bar to rise and fall. $c\ c$ are loops on the under side of the rider-bar, through which the rake-teeth pass.

G is a hand-lever, pivoted at $j$, and H is a link or connecting-rod connecting the inner end of the lever with a bearing, J, of the rider-bar, by which means the rider-bar and the rake-teeth may at any time be raised by hand to dump the load. Thus far the rake is of ordinary and well-known construction.

I I are two rock-shafts, resting at their inner ends in bearings $d\ d$ of the rider-bar, and at their outer ends in links K K, which will presently be described. Said outer ends have cleft or slotted heads $g\ g$, which embrace circular rims or flanges P P on the inner sides of the wheels. When in their normal position said slotted heads allow the rims to revolve freely through them, but when they are turned axially they cramp and bind upon the rims and revolve with them.

$h$ is a crank, formed by bending down the two inner ends of the rock-shafts. $i$ is a chain, rod, or other connection, attached at one end to the crank $h$ and at the other to the lower end of a pivoted foot-lever, $k$, by pressing on which the chain is drawn forward the rock-shafts are turned, and the slotted heads $g\ g$ are made to bind on the rims P P, and the rake-teeth are consequently raised to dump the load.

The arrangement above described is the same or similar to that shown in my patents of November 12, 1878, and June 3, 1879.

My present invention is as follows: The rider-bar F is pivoted to swing around the rod D, and the rims P P turn around the axis of the driving-wheels; hence in the raising of the rider-bar to dump the load it is necessary to allow a swinging movement of the slotted heads $g\ g$, to compensate for the eccentricity of action, and allow said heads to follow the rim in revolving. I employ for this purpose links or bearings K K at the outer ends of the rider-bar, said links being pivoted at their lower ends, at $r$, to the rider-bar, their upper ends being free to swing out and in, and carrying the ends of the rock-levers I I, as shown. These links preferably rest in slotted metallic boxes $s\ s$, secured to the ends of the rider-bar.

By the means above described the outer ends of the rock-shafts I I are free to move out and in, being guided by the links K K, and therefore they can follow the circle of the rims P P without cramping or binding.

The second feature of my invention is intended to obviate the too sudden falling of the rake-teeth when released by removing the pressure from the foot-lever $k$, the difficulty being that the teeth will frequently strike back into the windrow before they have fully passed over. To remedy this difficulty the following arrangement is used: S is a chain, or equivalent connection, attached to the lower end of the foot-lever $k$, and at the opposite end to a screw, $m$, or other adjusting device, connected with a stiff crank-arm, $w$, attached to the bar F, so as to turn on rod D. The chain S has a certain amount of slack, and the screw is so arranged that as the rider-bar rises the screw acts as a crank and takes up the slack of the chain, and, finally, when the chain becomes straight or taut, it draws upon the foot-lever and raises the foot of the operator, who relaxes his hold and allows the teeth to fall again. By this means great regularity in the fall of the teeth may be secured, which insures their falling outside of the windrow. Adjustment may be obtained by simply taking up or letting out the chain, but this is not sufficiently accurate for all kinds of work; hence the device to which the chain is attached at the rear is made adjustable in or out. This same arrangement is applicable to those rakes in which the rake-teeth are attached directly to the axle instead of to a rod in the rear, and in which the axle itself turns to raise the teeth. In such case the screw $m$ is attached directly to the axle, as shown in Fig. 5.

Having thus described my invention, I claim—

1. In a mounted horse-rake, the combination, with the rider-bar F and rock-shafts I I, of the links or bearings K K, pivoted to the rider-bar and supporting the rock-shafts, and so arranged, as described, as to prevent binding and strain on said shafts as they are carried up with the rims P P, as specified.

2. In a horse-rake, the combination, with the rake-head or axle, of the rock-shafts I I, the chain $i$, the foot-lever $k$, and the chain or equivalent connection S, connecting the foot-lever with a crank-pin on said rake-head or axle, as shown and described, and for the purpose specified.

In witness whereof I have hereunto signed my name in the presence of two subscribing witnesses.

DENNIS P. SHARP.

Witnesses:
R. F. OSGOOD,
R. E. WHITE.